United States Patent [19]

Marchasson et al.

[11] 4,166,981
[45] Sep. 4, 1979

[54] CONTINUOUS SIGNAL AMPLITUDE REGULATOR

[75] Inventors: Bernard Marchasson, St. Michel sur Orge; Rene Migeon, Paris, both of France

[73] Assignee: Compagnie Industrielle des Telecommunications Cit-Alcatel, Paris, France

[21] Appl. No.: 851,677

[22] Filed: Nov. 15, 1977

[30] Foreign Application Priority Data

Nov. 23, 1976 [FR] France ............................... 76 35218

[51] Int. Cl.² ........................................... H03F 3/66
[52] U.S. Cl. ...................................... 330/52; 330/86; 330/143; 330/282
[58] Field of Search ................... 330/52, 86, 129, 136, 330/143, 282, 85, 103; 325/407

[56] References Cited

U.S. PATENT DOCUMENTS

| | | | |
|---|---|---|---|
| 3,248,642 | 4/1966 | Rothschild | 330/86 X |
| 3,470,480 | 9/1969 | Smart et al. | 330/52 X |
| 3,510,793 | 5/1970 | Barber | 330/52 |
| 3,529,258 | 9/1970 | Schulz | 330/85 |
| 3,766,486 | 10/1973 | Ouvrier | 330/52 |

*Primary Examiner*—Lawrence J. Dahl
*Attorney, Agent, or Firm*—Roland Plottel

[57] ABSTRACT

The present invention concerns the transmission of information, and consists in a continuous regulator responsive to the amplitude of a pilot tone included in the signal whose level is to be regulated, including a variable-gain quadripole through which said signal is passed, an automatic gain control loop including a circuit controlling the gain of the quadripole, and an auxiliary feedback loop through which the control circuit also controls the automatic gain control loop. The regulator is applicable with advantage to transmission systems.

6 Claims, 3 Drawing Figures

CONTINUOUS SIGNAL AMPLITUDE REGULATOR

The present invention concerns the transmission of information. Transmission systems in use at the present time comprise a large number of items of equipment connected in series. For various reasons, it is necessary to maintain the amplitude of the transmitted signal at the terminals of these items of equipment within strict limits. This is acheived by including in the system devices known as regulators, whose function is to restore the signal amplitude to its nominal value. There are various kinds of regulator, and this invention is concerned with so-called continuous regulators, which rely on the presence in the transmitted signals of one or more pilot tones.

Continuous regulators generally comprise a variable-gain quadripole, through which the transmitted signal is passed, and an automatic gain control loop which is responsive to the level of the or each pilot tone. These regulators are characterised by two basic parameters, the compression ratio and the maximum envelope gain.

The compression ratio defines the static behaviour of the regulator. It is the ratio of the difference between the signal level at the input of the regulator and the nominal value to the difference between the signal level at the output of the regulator and the nominal value.

The maximum envelope defines the dynamic behaviour of the regulator. It is the maximum gain that can be applied by the regulator to amplitude modulation of the level of the or each pilot tone.

In known forms of regulator, the modulus of the maximum envelope gain is greater than 1. In other words, at certain frequencies these regulators amplify the amplitude modulation of the pilot tone or tones, instead of attenuating it. It will be shown later that the modulus of the maximum envelope gain increases with the compression ratio in such a way that it limits the compression ratio and consequently the efficiency of the regulator.

Furthermore, these known regulators only partially compensate the signal level, the residual error being always in the same sense as the error at the input to the regulator. Thus they do not permit pre-correction of the signal level.

The object of the present invention is to provide a continuous regulator with improved characteristics, in particular a regulator which has, for a given compression ratio, a lower value of the maximum envelope gain than currently known regulators.

Another object of the invention is to provide a continuous regulator which can produce overcompensation of the signal level in order to permit precorrection of the signal level.

The present invention provides a continuous signal amplitude regulator, comprising a variable-gain quadripole through which there is passed the signal whose level is to be regulated and a main feedback loop including a circuit for controlling the gain of the quadripole so as to provide automatic gain control by increasing the gain of the quadripole if the signal level decreases and decreasing the gain of the quadripole if the signal level increases, wherein the regulator further comprises an auxiliary feedback loop through which said gain control circuit also controls the gain of a component in the main feedback loop so as to increase the gain of said component if the difference between the detected signal level and the nominal value tends to increase and to decrease the gain of said component if the difference between the detected signal level and the nominal level tends to decrease.

An embodiment of the invention is described by way of example, with reference to the accompanying drawings, in which.

Figure 1:
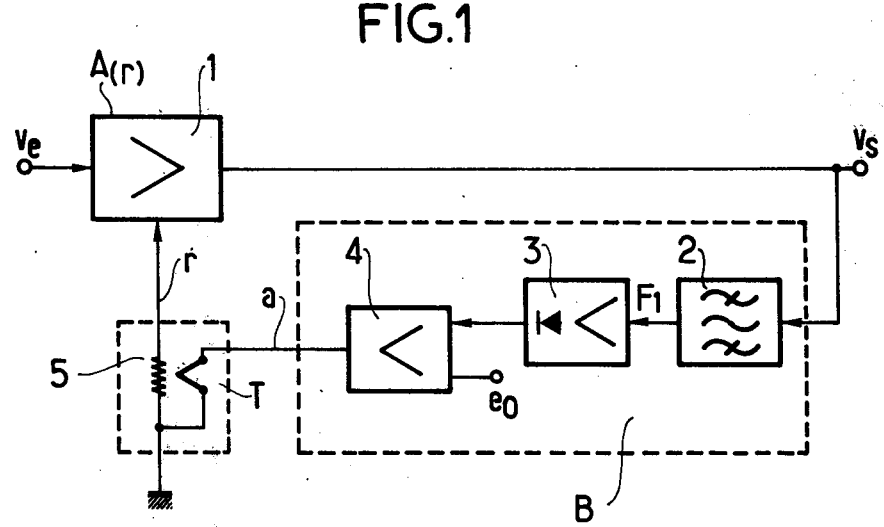
FIG. 1 is a block diagram of a prior art continuous regulator.

Referring to FIG. 1, the known form of continuous regulator shown in the figure relies on a pilot tone included in the signal for control purposes. The regulator comprises a variable-gain quadripole 1 and an automatic gain control (agc) loop including a bandpass filter 2, an amplifier-detector 3 and a level comparator 4. The agc loop also includes a gain control circuit 5 which controls the gain of the quadripole 1.

The signal $V_e$ whose level is to be regulated is applied to the input of the variable-gain quadripole 1. The output signal $V_s$ of the quadripole 1 is applied to the bandpass filter 2 which extracts the pilot tone $F_1$, which is applied to the input of the amplifier-detector 3, the output signal of which consists of a voltage proportional to the amplitude of the pilot tone. This voltage is compared with a reference dc voltage $e_o$ by the comparator 4, and the resulting difference signal is applied to the gain control circuit 5.

In this example, the automatic gain control circuitry uses dc voltages, but it is also possible to use alternating voltages. The gain control circuit 5 can be of various types, and is commonly of the type including an indirectly heated thermistor, as shown in the figures.

The circuit of this regulator can be analysed by lumping the bandpass filter 2, the amplifier-detector 3 and the comparator 4 in a single quadripole with input signal $V_s$, output signal a and transfer function B. If T is the transfer function of the gain control circuit 5 and A(r) the gain of the variable-gain quadripole 1, then the circuit of FIG. 1 is governed by the following equations:

$$V_s = A(r)V_e$$

$$a = BV_s$$

$$r = T \cdot a \qquad (1)$$

By definition, the compression ratio K is:

$$K = \frac{\frac{dV_e}{V_e}}{\frac{dV_s}{V_s}}$$

The response $dV_s$ of the regulator to small variations $dV_e$ in the input signal can be calculated by differentiating and combining the above equations (1). This yields:

$$dV_s = \frac{A(r)}{1 - V_e TBA'(r)} dV_e$$

where $A'(r)$ is the differential with respect to r of $A(r)$. Thus:

$$\frac{dV_s}{V_s} = \frac{1}{1 - V_e TBA'(r)} \frac{dV_e}{V_e}$$

The compression ratio K is therefore given by:

$$K = 1 - V_e TBA'(r)$$

In practice, the level of the pilot tone varies at a very low frequency. In these circumstances, and to a first approximation, the terms $V_e$, B and A'(r) are constant and the term T due to the presence of the thermistor can be represented by a transfer function with two real negative poles $-\alpha_1$ and $-\alpha_2$ whence:

$$V_e TBA'(r) = \frac{h}{(p + \alpha_1)(p + \alpha_2)}$$

where h is a real constant.

The dynamic response of the regulator is governed by the reciprocal of the compression ratio, which is called the envelope gain and is given by:

$$G(p) = \frac{1}{1 - \frac{h}{(p + \alpha_1)(p + \alpha_2)}}$$

or $$G(p) = \frac{(p + \alpha_1)(p + \alpha_2)}{(p + \alpha_1)(p + \alpha_2) - h}$$

For the regulator to be stable, the real portions of the poles of its envelope gain must be negative, as expressed by the condition:

$$\alpha_1 \alpha_2 - h > 0$$

The static compression ratio K of the regulator is given by:

$$K = \frac{1}{G(o)} = \frac{\alpha_1 \alpha_2 - h}{\alpha_1 \alpha_2} = 1 - \frac{h}{\alpha_1 \alpha_2}$$

The stability criterion is only satisfied if K is positive. Thus the regulator cannot produce overcompensation of the signal in order to permit precorrection of the signal level. Also, for the modulus of K to be greater than 1, the constant h must be negative. This corresponds to the fact that the agc loop must increase the gain of the quadripole in response to a decrease in the level of the pilot tone and vice versa.

G(p) is a minimum phase shift function, and has already been studied in some detail, for example in the paper by M. LOUBOUTIN entitled "Regulation de ligne dans certains types de systemes de transmission du type N+N" ("Line regulation in certain types of N+N transmission system"), published in the journal "Cables et transmissions," No. 4, October 1975. This shows that as the angular frequency $\omega$ increases from 0 to infinity, the modulus of the envelope gain increases from 1/K to a maximum value $G_m$ given by:

$$G_m = \left( \frac{2\sqrt{M} + (\alpha_1 + \alpha_2)^2 - h}{2\sqrt{M} + (\alpha_1 + \alpha_2)^2 + h} \right)^{\frac{1}{2}}$$

where $$M = \frac{h^2}{4} + (\alpha_1 + \alpha_2)^2 \left( \alpha_1 \alpha_2 - \frac{h}{2} \right)$$

for an angular frequency $\omega_m$ equal to:

$$\omega_m = \left( \alpha_1 \alpha_2 - \frac{h}{2} + \sqrt{M} \right)^{\frac{1}{2}}$$

and then gradually drops down to unity.

Furthermore, analysis of the variation of the maximum value $G_m$ as a function of the compression ratio K and the zeroes $-\alpha_1$ and $-\alpha_2$ of the envelope gain G(p) shows that the modulus of the maximum modulation gain $G_m$ increases with the compression ratio K and, for a given value of K, decreases as the zeroes $-\alpha_1$ and $-\alpha_2$ are moved apart while maintaining their sum constant.

As the constant h is negative, the modulus of $G_m$ is greater than 1. This means that at certain frequencies the regulator amplifies the amplitude modulation of the pilot tone. This effect is associated with the instability observed when a system includes more than one regulator, and means that limits are imposed in respect of the compression ratio K.

Figure 2:
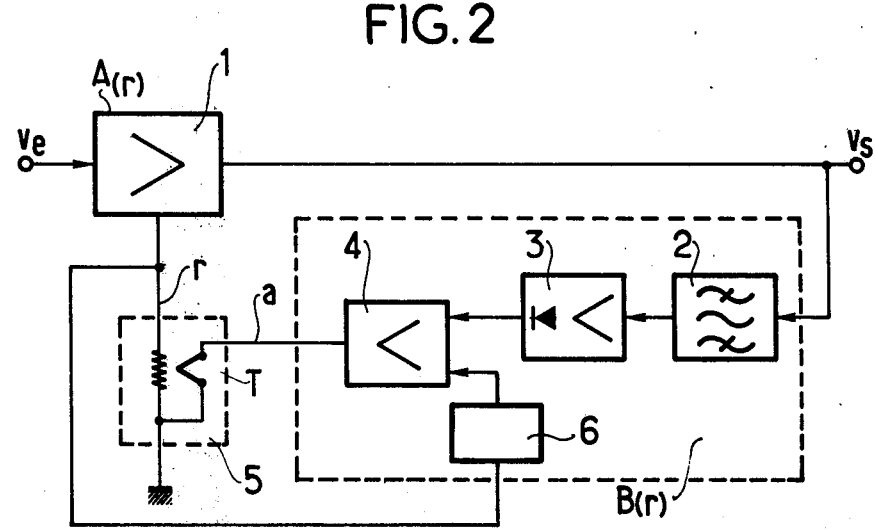
FIG. 2 is a block diagram of a continuous regulator in accordance with the invention.

FIG. 2 is a block diagram of a continuous regulator in accordance with the invention. Like the prior art regulator, this regulator comprises a variable-gain quadripole 1 and and agc loop including a bandpass filter 2, an amplifier-detector 3, a level comparator 4, a gain control circuit 5 and a reference voltage generator 6.

Once again, the regulator is analysed by lumping the bandpass filter 2, the amplifier-detector 3, the comparator 4 and the reference voltage generator 6 as a single quadripole with transfer function B. In this circuit, however, the transfer function B depends on the output level r of the gain control circuit 5.

The circuit shown in FIG. 2 is governed by the following equations:

$$V_s = A(r) V_e$$

$$a = B(r) V_s$$

$$r = Ta$$

The response $dV_s$ to a small variation $dV_e$ in the input voltage $V_e$ is obtained by differentiating and combining these equations to yield:

$$dV_s = A(r) \frac{1 - V_e TA(r) B'(r)}{1 - V_e T[A(r)B(r)]'} dV_e$$

where B'(r) is the differential with respect to r of the function B(r) and [A(r)B(r)]' is the differential with respect to r of the function [A(r)B(r)]. From this we can obtain:

$$\frac{dV_s}{V_s} = \frac{1 - V_e TA(r) B'(r)}{1 - V_e T[A(r)B(r)]'} \frac{dV_e}{V_e}$$

The compression ratio K is therefore given by:

$$K' = \frac{1 - V_e T[A(r)B(r)]'}{1 - V_e TA(r) B'(r)}$$

To analyse the dynamic behaviour of the regulator in accordance with the invention at low frequencies, we again assume that only T is variable, and that T may be represented by a transfer function with two real, negative zeroes $-\alpha_1$ and $-\alpha_2$ such that:

$$TV_e A'(r)B(r) = \frac{h'}{(p + \alpha_1)(p + \alpha_2)}$$

where h' is a real constant, whence:

$$TV_e A(r)B'(r) = \frac{nh'}{(p + \alpha_1)(p + \alpha_2)}$$

where n is a real coefficient of proportionality.

The use of the coefficient n, rather than another constant, enables us to return to the results obtained for the circuit of FIG. 1 by cancelling this coefficient.

The dynamic response of the regulator in accordance with the invention depends on the behaviour of its envelope gain g(p), which is given by:

$$g(p) = \frac{1 - \frac{nh'}{(p + \alpha_1)(p + \alpha_2)}}{1 - \frac{(n + 1)h'}{(p + \alpha_1)(p + \alpha_2)}}$$

or $$g(p) = \frac{(p + \alpha_1)(p + \alpha_2) - nh'}{(p + \alpha_1)(p + \alpha_2) - (n + 1)h'}$$

For the regulator to be stable, the real parts of the poles of the function g(p) must be negative, which is expressed by the condition:

$$\alpha_1\alpha_2 - (n+1)h' > 0$$

The static compression ratio K' of the regulator is given by the expression:

$$K' = \frac{1}{g(Q)} = \frac{\alpha_1\alpha_2 - (n + 1)h'}{\alpha_1\alpha_2 - nh'} = 1 - \frac{h'}{\alpha_1\alpha_2 - nh'}$$

and when the stability condition is complied with, this has the same sign as the term $(\alpha_1\alpha_2 - nh')$. The condition that its modulus is greater than unity is:

$$\left| \frac{\alpha_1\alpha_2 - (n + 1)h'}{\alpha_1\alpha_2 - nh'} \right| > 1 \quad (2)$$

This corresponds to two sets of conditions, depending on the sign of the term $(\alpha_1\alpha_2-nh')$:

(A) If $\alpha_1\alpha_2-nh'<0$ then condition (2) above becomes:

$$\alpha_1\alpha_2 - nh' - \frac{h'}{2} > 0 \quad (2')$$

In the particular case we are considering, this means that the constant h' is negative and so, consequently, is the coefficient n.

(B) If $\alpha_1\alpha_2-nh'<0$, the constant h' is negative. Condition (2) is thus confirmed. Under our working hypothesis, if the compression ratio K' is to be higher than that obtained with the regulator shown in FIG. 1, then the coefficient of proportionality n must be negative.

We are therefore justified in selecting negative values of the constant h' and the coefficient n and in verifying the condition:

$$\alpha_1\alpha_2 - nh' - \frac{h'}{2} > 0$$

This condition must be complied with if the modulus of the compression ratio K' is to be greater than unity, and this results in compliance with the stability criterion. These hypotheses are taken into account in the remainder of this description.

The behaviour of the regulator in accordance with the invention in terms of real frequencies is obtained by replacing the variable p by jω in the expression for the envelope gain g(p):

$$g(j\omega) = \frac{(\alpha_1\alpha_2 - \omega^2 - nh') + j\omega(\alpha_1 + \alpha_2)}{[\alpha_1\alpha_2 - \omega^2 - (n + 1)h'] + j\omega(\alpha_1 + \alpha_2)}$$

The square of the modulus of the modulation gain is given by:

$$|g(j\omega)|^2 = \frac{(\alpha_1\alpha_2 - \omega^2 - nh')^2 + \omega^2(\alpha_1 + \alpha_2)^2}{[\alpha_1\alpha_2 - \omega^2 - (n + 1)h']^2 + \omega^2(\alpha_1 + \alpha_2)^2} \quad (3)$$

or $$|g(j\omega)|^2 = 1 + 2h' \frac{\lambda - \omega^2}{[\alpha_1\alpha_2 - \omega^2 - (n + 1)h']^2 + \omega^2(\alpha_1 + \alpha_2)^2}$$

where:

$$a = \alpha_1\alpha_2 - nh' - \frac{h'}{2}$$

The coefficient a is positive because of the hypotheses we have adopted. For the same reason, the constant h' is negative and the modulus of the envelope gain is greater than unity for angular frequencies ω greater than $\sqrt{a}$.

Equation (3) shows that, with the hypotheses we have adopted, the square of the modulus of the envelope gain varies with the angular frequency ω in the same way as that of the prior art regulator described above. In fact, as the angular frequency ω increases from 0 to infinity, this square increases from a value of $1/K'^2$ to a maximum value $gm^2$ which is given by:

$$gm^2 = \frac{2\sqrt{\Delta} + (\alpha_1 + \alpha_2)^2 - h'}{2\sqrt{\Delta} + (\alpha_1 + \alpha_2)^2 + h'}$$

where:

$$\Delta = \frac{h'^2}{4} + a(\alpha_1 + \alpha_2)^2$$

for an angular frequency ωm given by:

$$\omega m = (a + \sqrt{\Delta})^{\frac{1}{2}}$$

and then gradually drops down to unity.

To compare the regulator in accordance with the invention with the prior art regulator described above, we can take advantage of the fact that the envelope gain G(jω) of the prior art regulator can be obtained from the envelope gain g(jω) of the regulator in accordance with the invention by cancelling the coefficient of proportionality n.

The modulus of the maximum envelope gain gm increases as the value of the coefficient n varies from 0 to the negative value $(\alpha_1\alpha_2/h')-\frac{1}{2}$, which is the negative limit we have adopted. The compression ratio K' increases to plus infinity as n varies from 0 to $(\alpha_1\alpha_2/h')$, and then changes sign and increases from minus infinity to $-1$ as n varies from $(\alpha_1\alpha_2/h')$ to $(\alpha_1\alpha_2/h')-\frac{1}{2}$.

A significant improvement is therefore to be expected in the region of $(\alpha_1\alpha_2/h')$, which confirms the stability criterion.

It can be shown that this improvement is achieved when $(\alpha_1\alpha_2/h')<n<0$ by making the envelope gain g(p) of the regulator in accordance with the invention identical to the envelope gain G(p) of the prior art regulator, by changing the constants in accordance with the following equations:

$$\delta_1 = \frac{\alpha_1 + \alpha_2 - [(\alpha_1 - \alpha_2)^2 + 4nh']^{\frac{1}{2}}}{2}$$

$$\delta_2 = \frac{\alpha_1 + \alpha_2 + [(\alpha_1 - \alpha_2)^2 + 4nh']^{\frac{1}{2}}}{2}$$

$\delta_1$ and $\delta_2$ are real since the constant h' and the coefficient n are negative, and they are both positive because one of them is positive ($\delta_2$) and so is their product $\delta_1\delta_2$.

The function g(p) becomes:

$$g(p) = \frac{(p + \delta_1)(p + \delta_2)}{(p + \delta_1)(p + \delta_2) - h'}$$

This expression is of the same form as that for G(p), $\delta_1$ and $\delta_2$ being real and positive, h' being negative. The results of the analysis of the function G(p) can be utilised by replacing $\alpha_1$ and $\alpha_2$ by $\delta_1$ and $\delta_2$ and replacing h by h'.

It should be noted that:

$$\delta_1+\delta_2=\alpha_1+\alpha_2$$

$$\delta_1\delta_2 = \frac{\alpha_1\alpha_2}{1 + n(1 - K')}$$

where $1+n(1-K')>1$, which implies that $\delta_1\delta_2<\alpha_1\alpha_2$.

It can be seen that if $(\alpha_1\alpha_2/h')<n<0$, the regulator in accordance with the invention has an envelope gain equivalent to that of the regulator shown in FIG. 1 with artificially spaced values of $\alpha_1$ and $\alpha_2$ and their sum maintained constant. As has already been indicated, the result of this is to decrease the maximum envelope gain for a given compression ratio K.

The above analysis shows that if the constant h' and the coefficient n are negative, then the regulator in accordance with the invention will be stable if:

$$\alpha_1\alpha_2-(n+1)h'>1$$

The fact that the constant h' is negative implies that if the gain control circuit 5 has no effect on the quadripole with the transfer function B(r), assuming that the coefficient n is zero, then the regulator in accordance with the invention behaves in the same manner as the prior art regulator shown in FIG. 1. In other words, the gain control circuit 5 controls the gain of the quadripole 1 in such a way that the gain increases if the level of the transmitted signal decreases, and vice versa.

The fact that the coefficient of proportionality n is also negative implies that the gain control circuit 5 reinforces the action of the agc loop if the detected level difference tends to increase and counters its action if the detected level difference tends to decrease.

In the block diagram of FIG. 2, the gain control circuit 5 acts on the agc loop by controlling the reference voltage applied to the comparator 4, increasing this level if the detected level of the pilot tone tends to drift away from the reference level from below or to drift towards it from above, decreasing the reference level in the opposite case.

Figure 3:
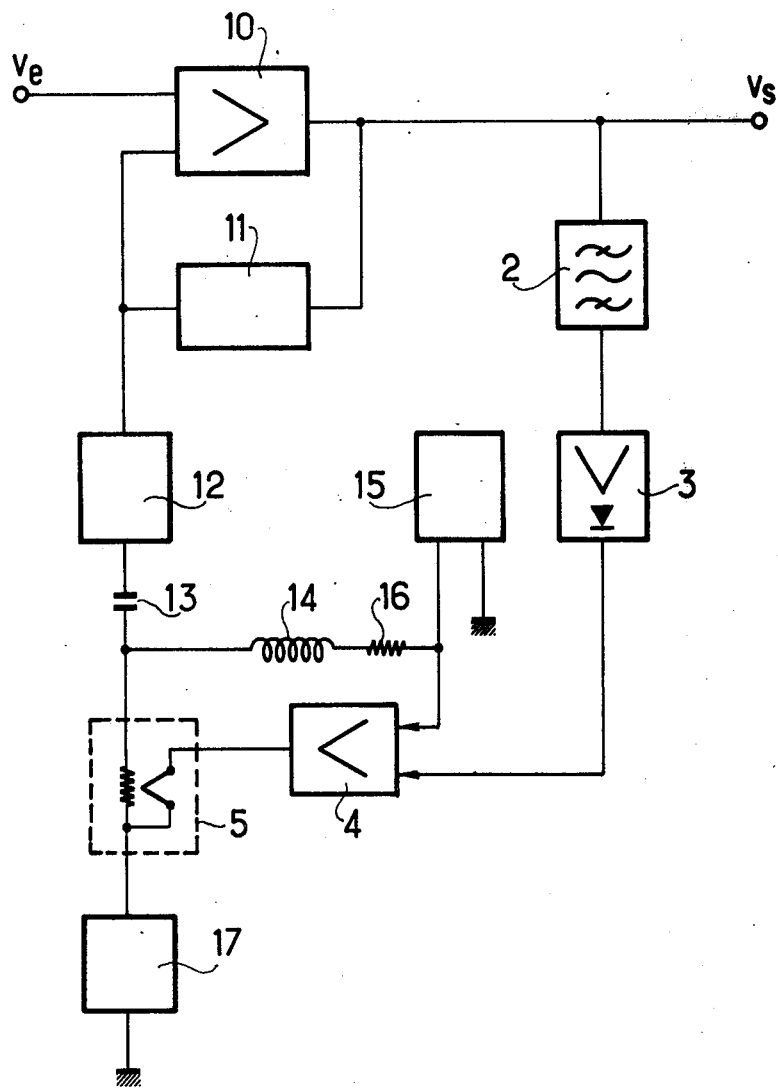
FIG. 3 is a more detailed block diagram of a continuous regulator in accordance with the invention.

FIG. 3 shows a practical embodiment of the regulator shown in FIG. 2. The variable-gain quadripole consists of an amplifier 10 through which is passed the signal whose level is to be regulated. The amplifier 10 has a feedback network 11, the gain of the network 11 being varied by means of a Bode network 12 looped by the variable resistance of the thermistor 5. The agc loop includes a bandpass filter 2 which extracts the pilot tone from the output signal of the amplifier 10, an amplifier-detector 3 which detects the level of the pilot tone, and a comparator 4 supplying heating current to the thermistor 5.

A dc reference voltage generator 15, which has a certain internal resistance, has one terminal earthed and another connected to a series-connected circuit comprising a resistor 16, an inductor 14, the variable resistor of the thermistor 5, and another dc reference voltage generator 17 connected in opposition to the generator 15. The terminal of the generator 17 that is not connected to the thermistor 5 is connected to earth. The voltage generated by the generator 17 is higher than that generated by the generator 15. A decoupling capacitor 13 is connected between the thermistor 5 and the Bode network 12. The terminal of the generator 15 connected to the resistor 16 is also connected to the reference input of the comparator 4, and applies to that input a reference voltage which depends on the combined effects of the generators 15 and 17. The other input of the comparator 4 is connected to the output of the amplifier-detector 3.

This embodiment shows how easy it is to apply the invention to a prior art regulator. All that is required is to connect the reference input of the comparator 4 to a dc voltage source 15 and, via an inductor 14 and resistor 16, to the variable resistance of the thermistor 5 connected in series with a dc voltage source 17, and to connect a series decoupling capacitor 13 between the variable resistance of the thermistor and the Bode network.

The indirectly heated thermistor 5 passes an alternating current which controls the gain of the quadripole 1 and a dc current for modifying the reference voltage of the comparator 4. The capacitor 13 acts as a high-pass filter, and the inductor 14 as a low-pass filter. The degree of feedback can be regulated by varying the voltage produced by the generator 17 or by varying the value of the resistor 16.

The filter action of the inductor 14 may instead be provided by an RC filter.

It is possible to envisage other embodiments, the gain control circuit 5 acting on another point in the agc loop, the amplifier-detector 3, for example, or an auxiliary variable gain quadripole connected into the loop.

The regulator in accordance with the invention which has just been described may be used with advantage in cable transmission systems incorporating repeaters, enabling the envelope gain to be reduced and the signal level to be pre-corrected, by overcompensation of the level, so as to make the best use of the repeater characteristics.

What is claimed is:

1. A continuous signal amplitude regulator, said signal including at least one pilot tone of fixed frequency, which comprises:

a variable gain quadripole through which is passed the signal to be regulated;

a main feedback loop for controlling the gain of said quadripole, said feedback loop including an automatic gain control circuit having components which include:

a bandpass filter for separating said at least one pilot tone from the signal to be regulated;

an amplifier-detector for detecting said filtered pilot tone thereby to produce a d.c. signal;

a source of a reference potential; and a comparator for generating an output signal which is indicative of the difference between said reference potential and said d.c. signal;

a gain control circuit receiving said comparator output signal and controlling the gain of said variable gain quadripole, the amplitude regulator further comprising:

an auxiliary feedback loop through which said gain control circuit also controls the gain of a component in the main feedback loop so as to increase the gain of said component if the difference between said d.c. signal and said reference potential tends to increase and to decrease the gain of said component if the difference between said d.c. signal and said reference potential tends to decrease.

2. The regulator according to claim 1 wherein said auxiliary feedback loop interconnects the output of said gain control circuit and the source of said reference potential to increase said reference potential if said d.c. signal tends to drift away from said reference potential from below or to drift towards it from above, decreasing said reference potential in the opposite case.

3. The regulator according to claim 1 wherein said gain control circuit includes an indirectly heated thermistor which passes an alternating current for controlling the gain of the quadripole and a direct current for modifying the reference voltage of the comparator.

4. The regulator according to claim 3 wherein the direct current passed by the resistance of the indirectly heated thermistor is generated by a d.c. reference voltage source which is connected to the reference input of said comparator and, through an inductance, a resistance and the resistance of the indirectly heated thermistor, to a second voltage source which is in opposition to said reference voltage source.

5. The regulator according to claim 2 wherein said gain control circuit includes an indirectly heated thermistor which passes an alternating current for controlling the gain of the quadripole and a direct current for modifying the reference voltage of the comparator.

6. The regulator according to claim 5 wherein the direct current passed by the resistance of the indirectly heated thermistor is generated by a d.c. reference voltage source which is connected to the reference input of said comparator and, through an inductance, a resistance and the resistance of the indirectly heated thermistor, to a second voltage source which is in opposition to said reference voltage source.

* * * * *